(12) United States Patent
Jeong et al.

(10) Patent No.: US 8,327,217 B1
(45) Date of Patent: Dec. 4, 2012

(54) GENERATING SOFT Q-ARY CHANNEL INFORMATION

(75) Inventors: Seongwook Jeong, Saint Paul, MN (US); Jaekyun Moon, Daejeon (KR)

(73) Assignee: Link_A_Media Devices Corporation, Santa Clara, CA (US)

( * ) Notice: Subject to any disclaimer, the term of this patent is extended or adjusted under 35 U.S.C. 154(b) by 623 days.

(21) Appl. No.: 12/589,635

(22) Filed: Oct. 26, 2009

Related U.S. Application Data

(60) Provisional application No. 61/197,500, filed on Oct. 27, 2008.

(51) Int. Cl.
*G06F 11/00* (2006.01)

(52) U.S. Cl. ......................................................... 714/752

(58) Field of Classification Search ................... 714/752
See application file for complete search history.

(56) References Cited

U.S. PATENT DOCUMENTS

| | | | |
|---|---|---|---|
| 6,511,280 B1 * | 1/2003 | Sammartino et al. .......... 414/784 |
| 6,831,905 B1 * | 12/2004 | Lomp et al. .................... 370/335 |
| 8,015,468 B2 * | 9/2011 | Krouk et al. .................... 714/752 |
| 8,136,005 B1 * | 3/2012 | Nazari et al. ................... 714/752 |
| 2001/0019576 A1 * | 9/2001 | Nystrom et al. ............... 375/136 |
| 2008/0276156 A1 | 11/2008 | Gunnam et al. |
| 2008/0301521 A1 | 12/2008 | Gunnam et al. |
| 2009/0282320 A1 * | 11/2009 | Liao et al. ...................... 714/784 |
| 2011/0041041 A1 * | 2/2011 | Kim .............................. 714/780 |

OTHER PUBLICATIONS

Roger Wood, "Turbo-PRML: A Compromise EPRML Detector", IEEE Transactions on Magnetics, vol. 29, No. 6, Nov. 1993.

Alhussien et al., "Iterative Decoding Based on Error Pattern Correction", IEEE Transactions on Magnetics, vol. 44, No. 1, Jan. 2008.

* cited by examiner

*Primary Examiner* — Bryce Bonzo
(74) *Attorney, Agent, or Firm* — Van Pelt, Yi & James LLP

(57) ABSTRACT

A probability is determined, including by obtaining a set of probability ratios, wherein each probability ratio in the set is a ratio of a first probability to a second probability. A probability $P(E_m=z)$ that an $m^{th}$ error symbol $E_m$ has a level of z is determining based at least in part on one or more dominant error patterns.

20 Claims, 5 Drawing Sheets

| | | |
|---|---|---|
| 401 | $\varepsilon^{(1)}$ | [1] |
| 402 | $\varepsilon^{(2)}$ | [11] |
| 403 | $\varepsilon^{(3)}$ | [111] |
| 404 | $\varepsilon^{(4)}$ | [1111] |
| 405 | $\varepsilon^{(5)}$ | [11111] |
| 406 | $\varepsilon^{(6)}$ | [111111] |
| 407 | $\varepsilon^{(7)}$ | [1111111] |
| 408 | $\varepsilon^{(8)}$ | [11111111] |

FIG. 4A

GENERATING SOFT Q-ARY CHANNEL INFORMATION

CROSS REFERENCE TO OTHER APPLICATIONS

This application claims priority to U.S. Provisional Patent Application No. 61/197,500 entitled GENERATING SOFT Q-ARY CHANNEL INFORMATION filed Oct. 27, 2008 which is incorporated herein by reference for all purposes.

BACKGROUND OF THE INVENTION

Some decoders (such as q-ary low density parity checks (LDPC) and soft-input Reed-Solomon decoders) are configured to input q-ary symbol level soft information. In some cases, however, that information is not available in existing decoding systems. New techniques and systems to generate this information would be desirable.

BRIEF DESCRIPTION OF THE DRAWINGS

Various embodiments of the invention are disclosed in the following detailed description and the accompanying drawings.

FIG. 4A is a diagram showing an embodiment of dominant error patterns that include all 1's.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
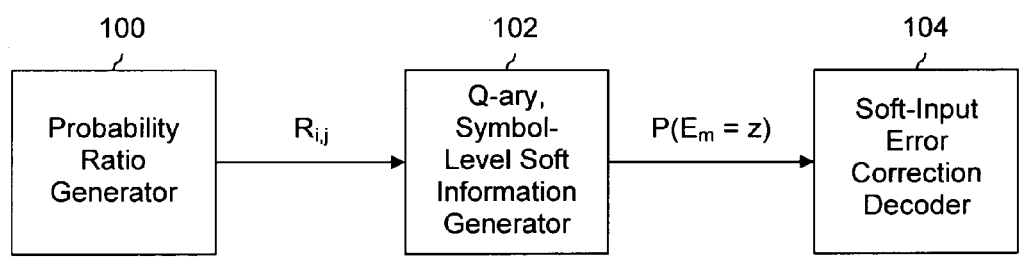
FIG. 1. is a diagram showing an embodiment of a system configured to generate a probability $P(E_m=z)$ that an $m^{th}$ error symbol $E_m$ has a level of z based at least in part on one or more dominant error patterns.

FIG. 1 is a diagram showing an embodiment of a system configured to generate a probability $P(E_m=z)$ that an $m^{th}$ error symbol $E_m$ has a level of z based at least in part on one or more dominant error patterns. In the example shown, $R_{i,j} = R(e_j^{(i)}) \triangleq P(e_j^{(i)})/P(e_j^{(i)}=0)$ is the probability of having a particular error pattern $e^{(i)}$ at the $j^{th}$ bit location on the detector's binary decision path divided by the all-zero error probability in the same region. In other words, Ri,j is a probability ratio: a ratio of a first probability (i.e., the probability $P(e_j^{(i)})$) to a second probability (i.e., $P(e_j^{(i)}=0)$). Note that an error pattern is defined with respect to a certain decision pattern and in this sense the probabilities discussed here are conditioned on some detector output sequence. The probability ratios $R_{i,j}$'s (or their corresponding log-domain values) are generated by probability ratio generator 100. In some embodiments, probability ratio generator 100 includes a bank of error event correlators. Q-ary, symbol-level soft information generator 102 is configured to convert the matrix of $R_{i,j}$'s or the corresponding log-domain values to q-ary symbol-level soft information that are passed to soft-input decoder 204. In some embodiments, decoder 104 is a q-ary low density parity check (LDPC) decoder or a soft-input Reed-Solomon decoder.

Figure 2:
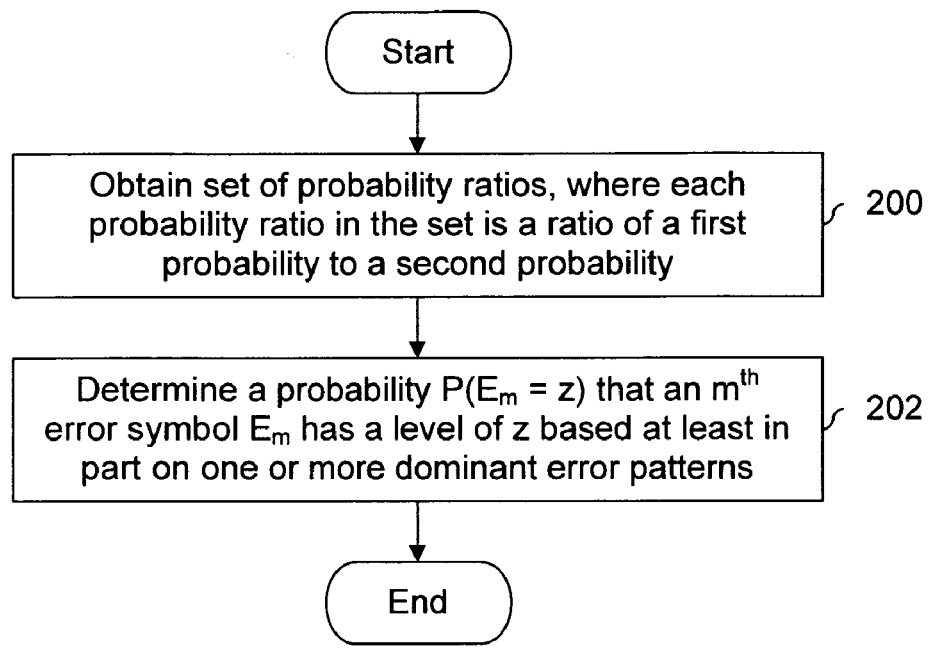
FIG. 2 is a flowchart illustrating an embodiment of a process for determining a probability $P(E_m=z)$.

FIG. 2 is a flowchart illustrating an embodiment of a process for determining a probability $P(E_m=z)$. In some embodiments, q-ary, symbol-level soft information generator 102 in FIG. 1 is configured to perform the process shown in FIG. 2.

At 200, a set of probability ratios is obtained, where each probability ratio in the set is a ratio of a first probability to a second probability. For example, the set of probability ratios may include $R_{i,j} = R(e_j^{(i)}) \triangleq P(e_j^{(i)})/P(e_j^{(i)}=0)$ so that the second probability in the probability ratio is a probability that the $m^{th}$ error symbol $E_m$ has a level of z that corresponds to an error-free level. In the equation above, the error-free level includes all 0's when expressed in bits but in some embodiments an error-free level is indicated by all 1's when expressed in bits. As shown in FIG. 1, in some embodiments, the set of probability ratios is obtained from a bank of error event correlators.

At 202, a probability $P(E_m=z)$ that an $m^{th}$ error symbol $E_m$ has a level of z is determined based at least in part on one or more dominant error patterns. As used herein, a dominant error pattern is defined to be an error pattern that occur with a frequency that exceed a certain preset threshold. In some embodiments, the one or more dominant error patterns include(s) a pattern that includes all 1's when expressed in bits (e.g., [1] or [11] or [111] whereas [0] or [00] or [01] or [10] would not be a dominant error pattern in such embodiments). An all 1's dominant pattern is just an example and also happens to be a dominant pattern for some commercial disk systems. In some other embodiments, a dominant error pattern includes one or more 0's.

In some embodiments, the determined probability is passed to an error correction decoder configured to input q-ary symbol level soft information, such as a q-ary low density parity check (LDPC) decoder or a soft-input Reed-Solomon decoder.

In various embodiments determining at 202 includes using $$P(E_m = 0) \sum_{[e_j^{(i)}]_{mp}^{(m+1)p-1}=z} R(e_j^{(i)}) \text{ and/or}$$

$$P(E_m = 0) \sum_{(i,j) \in A(m,z)} R_{i,j} \text{ to determine } P(E_m = z),$$

using $\Pi_i P(E_m = z_i)$ to determine $P(E_m = z)$, and/or using $1/(1+\Sigma_{(i,j) \in A(m,z)} R_{i,j})$ to determine $P(E_m = 0)$. These equations are discussed in further detail below.

Figure 3:
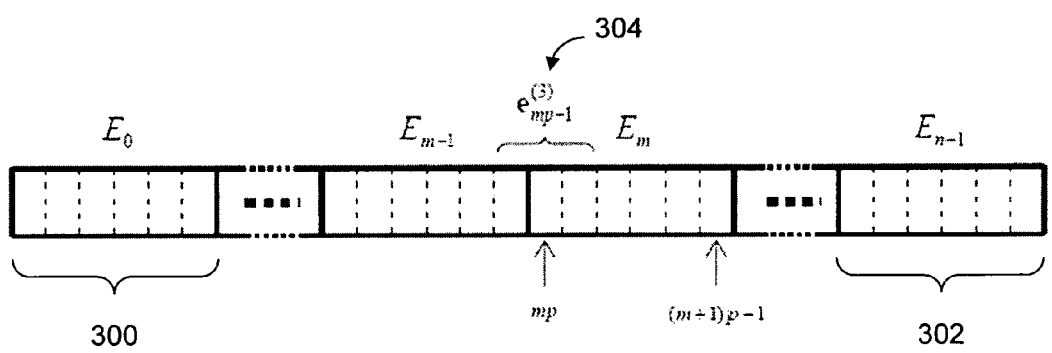
FIG. 3 is a diagram showing an embodiment of a sequence of n symbols that comprise a sector.

FIG. 3 is a diagram showing an embodiment of a sequence of n symbols that comprise a sector. $E_m$ represents the $m^{th}$ q-ary error symbol made up of a sequence of bits and ranges from $E_0$ (300) to $E_m$ (302). The total number of bits in the example sector is np. The np-long binary sequence e (corresponding to the n-long $E_m$ sequence) is simply the difference between the correct binary data sequence b and the detector's decision sequence d, with the understanding that the difference is given in modulo 2 so that every −1 is replaced by 1. Put another way, a 1 indicates there is an error in that bit and a 0 indicates there is no error in that bit. Note that for a given binary sequence b, the error sequence cannot take value −1 for bit positions where b takes 1 (likewise e cannot be +1 where b=−1). The probabilities of these impossible error events are assumed to have been forced zero during the computation of $R_{i,j}$'s or the corresponding log-domain values.

If the detector decision is error-free, then the error sequence e will be an all-zero sequence. Both the p-tuple representation and the q-ary representation will be used interchangeably for $E_m$. For example, when there is one bit error within the $m^{th}$ symbol window and if it happens at the first bit position, then we write $E_m=[100 \ldots 00]$ or $E_m=1 \cdot 2^{p-1} + 0 \cdot 2^{p-2} + 0 \cdot 2^{p-3} + \ldots + 0 \cdot 2^2 + 0 \cdot 2^1 = q/2$.

We wish to compute the probability that $E_m = z$ for each level of $z=0, 1, 2, \ldots, q-1$, conditioned on the given detector decision sequence (naturally, z can also represent the corresponding p-bit binary pattern). For a given value z, we need to account for all possible error patterns that can give rise to that value within the $m^{th}$ symbol window. The error patterns that need be considered include those that start within previous symbol windows. As an example, assume that we have L=8 dominant error patterns to consider, each of which is an all 1's pattern. FIG. 4A is a diagram showing an embodiment of dominant error patterns that include all 1's. In that example $e^{(1)}=[1]$ (401), $e^{(2)}=[11]$ (402), $e^{(3)}=[111]$ (403), $e^{(4)}=[1111]$ (404), $e^{(5)}=[11111]$ (405), $e^{(6)}=[111111]$ (406), $e^{(7)}=[1111111]$ (407), $e^{(8)}=[11111111]$ (408). In this example, p=6. Returning to FIG. 3, that figure shows which bits are related to the error pattern $e_{mp-1}^{(3)}$(304). The subscript (i.e., mp−1 in this example) indicates the bit in which the pattern begins and the superscript (i.e., 3 in this example) indicates the length of the pattern in bits.

Figure 4B:
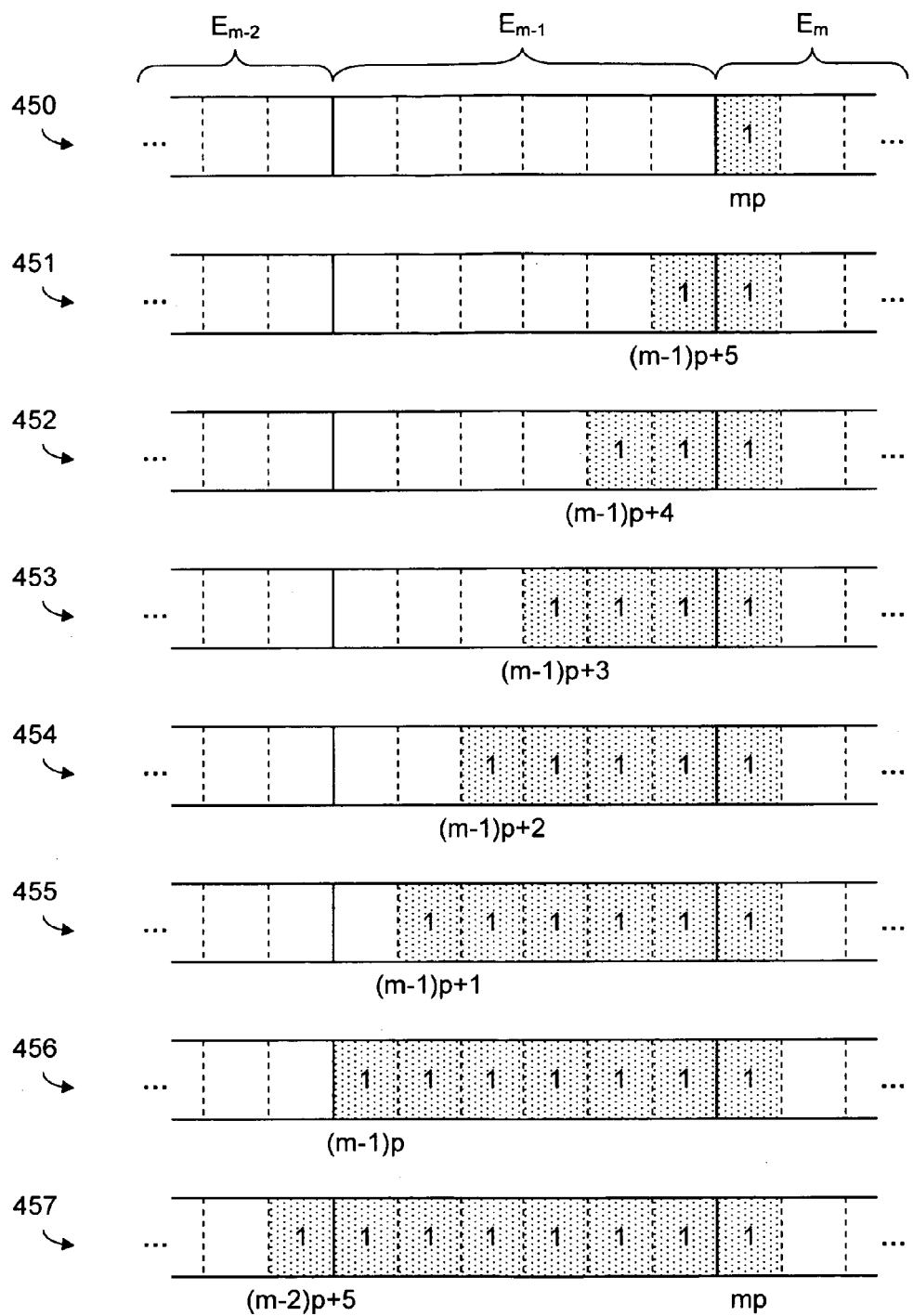
FIG. 4B is a diagram showing an embodiment of bits that are associated with the terms of an example equation for $$\frac{P\left(E_m=\frac{q}{2}\right)}{P(E_m=0)}.$$

The probability that $E_m=q/2$ (or $E_m=[100000]$) is given by $$\frac{P(E_m = \frac{q}{2})}{P(E_m = 0)} \approx R(e_{mp}^{(1)}) + R(e_{(m-1)p+5}^{(2)}) +$$
$$\ldots + R(e_{(m-1)p+1}^{(6)}) + R(e_{(m-1)p}^{(7)}) + R(e_{(m-2)p+5}^{(8)}) =$$
$$R_{1,mp} + R_{2,(m-1)p+5} + \ldots + R_{6,(m-1)p+1} + R_{7,(m-1)p} + R_{8,(m-2)p+5}$$

where the approximation is due to the fact that the denominator probabilities associated with the all-zero local error events $e_j^{(i)}=0$ in general different from one another as well as from the probability of $E_m=0$. FIG. 4B is a diagram showing an embodiment of bits that are associated with the terms of the example equation above for $$\frac{P(E_m = \frac{q}{2})}{P(E_m = 0)}.$$

At 450, the bits associated with the first term (i.e., $R(e_{mp}^{(1)})$ or $R_{1,mp}$) are shown. At 451, the bits associated with the second term (i.e., $R(e_{(m-1)p+5}^{(2)})_{p+5}$) or $R_{2,(m-1)p+5}$) are shown, and so on.

In general, we can write $$P(E_m = z) \approx P(E_m = 0) \sum_{[e_j^{(i)}]_{mp}^{(m+1)p-1}=z} R(e_j^{(i)}) = \quad \text{(Equation 1)}$$
$$P(E_m = 0) \sum_{(i,j) \in A(m,z)} R_{i,j}$$

where the summation is over all pairs of (i,j) for which $[e_j^{(i)}]_{mp}^{(m+1)p-1}=z$ with $[e]_a^b$ denoting a truncated portion of the sequence e as specified by the end points a and b. In other words, A(m,z) is the set of all (i,j) index pairs for which the portion of the error pattern $e_j^{(i)}$ captured within the $m^{th}$ symbol window corresponds to the specific p-bit pattern or q-ary value z. Note that (1) assumes only one error event can happen within a given symbol window, irrespective of whether it resides partially or fully within the window. In general, multiple error patterns can happen, albeit rare, within a symbol window. For example, two single-error patterns can occur inside one symbol window. Multiple error events lead to a value of z that cannot be accounted for by considering only the single occurrences of the error event as in (1). Consider as an example $E_m=[100110]$. This error event can be decomposed into two dominant events [100000] and [000110]. Accordingly, we have $$P(E_m=[100110])=P(E_m=[100000]) \cdot P(E_m=[000110])$$

In general, for a composite error event that can be expressed as $E_m=z=\Sigma_i z_i$, where $z_i$'s represent dominant single error events, we can write $$P(E_m=z)=\Pi_i P(E_m=z_i) \quad \text{(Equation 2)}$$

In some embodiments, determining at step 202 in FIG. 2 includes decomposing a composite error event (e.g., $E_m=[100110]$) into two or more dominant single error events (e.g., $E_m=[100000]$ and $E_m=[000110]$).

Finally, $P(E_m=0)$ can be obtained indirectly from the fact that $\Sigma_{z=\{0, 1, 2, \ldots, q-1\}} P(E_m=z)=1$. This can be written as:

$$\sum_{z=\{0,1,2,\ldots,q-1\}} P(E_m = z) = P(E_m = 0) + \sum_{z=\{1,2,\ldots,q-1\}} P(E_m = z) \approx$$

$$P(E_m = 0)\left(1 + \sum_{(i,j)\in A(m,z)} R_{i,j}\right)$$

from which the following is obtained:

$$P(E_m=0) \approx 1/(1+\Sigma_{(i,j)\in A(m,z)} R_{i,j}) \qquad \text{(Equation 3)}$$

The probabilities associated with all q distinct values of z can be obtained for each m using (1) for the single occurrences, (2) for composite error patterns and (3) for the all-zero error pattern.

As an example, consider L=8 and p=6 and again assume only the all 1's dominant error patterns. First consider only the single occurrences. For single-bit error events, we then have $$\frac{P(E_m = [100000])}{P(E_m = [000000])} \approx R_{1,mp} + R_{2,mp-1} + \ldots + R_{7,mp-6} + R_{8,mp-7}$$

$$\frac{P(E_m = [010000])}{P(E_m = [000000])} \approx R_{1,mp+1}$$

$$\frac{P(E_m = [001000])}{P(E_m = [000000])} \approx R_{1,mp+2}$$

$$\frac{P(E_m = [000100])}{P(E_m = [000000])} \approx R_{1,mp+3}$$

$$\frac{P(E_m = [000010])}{P(E_m = [000000])} \approx R_{1,mp+4}$$

$$\frac{P(E_m = [000001])}{P(E_m = [000000])} \approx R_{1,mp+5} + R_{2,mp+5} + \ldots + R_{7,mp+5} + R_{8,mp+5}$$

For double-bit error events, we have $$\frac{P(E_m = [110000])}{P(E_m = [000000])} \approx R_{2,mp} + R_{3,mp-1} + \ldots + R_{7,mp-5} + R_{8,mp-6}$$

$$\frac{P(E_m = [011000])}{P(E_m = [000000])} \approx R_{2,mp+1}$$

$$\frac{P(E_m = [001100])}{P(E_m = [000000])} \approx R_{2,mp+2}$$

$$\frac{P(E_m = [000110])}{P(E_m = [000000])} \approx R_{2,mp+3}$$

$$\frac{P(E_m = [000011])}{P(E_m = [000000])} \approx R_{2,mp+4} + R_{3,mp+4} + \ldots + R_{7,mp+4} + R_{8,mp+4}$$

For triple-bit error events, we have $$\frac{P(E_m = [111000])}{P(E_m = [000000])} \approx R_{3,mp} + R_{4,mp-1} + \ldots + R_{7,mp-4} + R_{8,mp-5}$$

$$\frac{P(E_m = [011100])}{P(E_m = [000000])} \approx R_{3,mp+1}$$

$$\frac{P(E_m = [001110])}{P(E_m = [000000])} \approx R_{3,mp+2}$$

$$\frac{P(E_m = [000111])}{P(E_m = [000000])} \approx R_{3,mp+3} + R_{4,mp+3} + \ldots + R_{7,mp+3} + R_{8,mp+3}$$

For quadruple-bit error events, we have $$\frac{P(E_m = [111100])}{P(E_m = [000000])} \approx R_{4,mp} + R_{5,mp-1} + \ldots + R_{8,mp-4}$$

$$\frac{P(E_m = [011110])}{P(E_m = [000000])} \approx R_{4,mp+1}$$

$$\frac{P(E_m = [001111])}{P(E_m = [000000])} \approx R_{4,mp+2} + R_{5,mp+2} + \ldots + R_{8,mp+2}$$

For quintuple-bit error events, we have $$\frac{P(E_m = [111110])}{P(E_m = [000000])} \approx R_{5,mp} + R_{6,mp-1} + R_{7,mp-2} + R_{8,mp-3}$$

$$\frac{P(E_m = [011111])}{P(E_m = [000000])} \approx R_{5,mp+1} + R_{6,mp+1} + R_{7,mp+1} + R_{8,mp+1}$$

For sextuple-bit error events, we have $$\frac{P(E_m = [111111])}{P(E_m = [000000])} \approx R_{6,mp} + R_{7,mp-1} + R_{8,mp-2} + R_{7,mp} + R_{8,mp}$$

There are a total of 6+5+ . . . +2+1=21 error events corresponding to single-occurrences of the dominant error patterns (out of 64 possible $E_m$ patterns). Now, probable composite error events can also be considered using only the very highly likely single occurrences of error events. If, for example, single-bit and double-bit error events happen to be the most probable error events based on above single-occurrence error event probability computation, then we can estimate the probabilities of composite error events made up of two single occurrences of these error events. For example, $$P(E_m=[101100])=P(E_m=[100000])\cdot P(E_m=[001100])$$

$$P(E_m=[100010])=P(E_m=[100000])\cdot P(E_m=[000010])$$

$$P(E_m=[110110])=P(E_m=[110000])\cdot P(E_m=[000110])$$

$$P(E_m=[011001])=P(E_m=[011000])\cdot P(E_m=[000001])$$

and so forth.

In some embodiments, determining a probability $P(Em=z)$ that an $m^{th}$ error symbol $E_m$ has a level of z based at least in part on one or more dominant error patterns includes decomposing a composite error event into two or more dominant single error events. In some embodiments, decomposing (as described above) includes using independent error events separated by i zeros when $E_m$ includes i consecutive 0's. For example, in determining how many individual error events make up a given $E_m$ pattern, we actually need to look at the length of intersymbol interference (ISI). It is well-known that in maximum-likelihood detection of an ISI channel, independent error events must be separated by at least l zeros where l is the number of ISI terms in the channel impulse response. For example, for the 1+0.9D channel that contains a single ISI term (D is the delay operator and the channel output signal $y_k$ in this case is related to the channel input $x_k$ by $y_k=x_k+0.9x_{k-1}$), independent error events are separated by one or more zeros. In the above example, we assumed a single-term ISI channel, and it can be seen that the $E_m$ pattern that contains any number of zero bits is constructed based on two or more single error events.

The probability of a composite error pattern can sometimes be obtained simply based on the probabilities of other composite error patterns and single error patterns that correspond to smaller decimal number representations. For example, given P($E_m$=[000101]), the probability of a composite error event made up of two dominant single error events and, P($E_m$=[110000]), the probability of a single dominant error event, P($E_m$=[110101]) follows immediately from the multiplication of the two earlier probabilities.

Note that we do not need to store the entire matrix of $R_{i,j}$'s or the corresponding log-probability values in real-time computation of $\pi_{z,m} \triangleq$ P($E_m$=z). In computing $\pi_{z,m}$ for a particular value m, we just need to use $R_{i,j}$'s whose j values (error event starting positions) are such that the error events are at least partially falls in the $m^{th}$ symbol window. In the case of all 1's dominant error events, as seen in the above example, we need to consider $R_{i,j}$'s for starting positions, mp−i+1≦j≦(m+1)p−1 (for m≧1), for each error event length 1≦i≦L.

Let $S_m$ and $D_m$ denote the actual symbol value (or p-tuple) and the symbol representation of the decision sequence within the symbol window, respectively (so that $E_m = S_m - D_m$). We can then write $$P(S_m = z + D_m) = P(E_m = z) = \pi_{z,m}$$

which gives the PMF function for the symbol (versus the error symbol). Keep in mind that the probability P($E_m$=z) is really a probability conditioned on a particular decision symbol $D_m$.

We finally note that it is straightforward to derive the log-domain versions of (1), (2) and (3) to work directly in log-domain, which may be desirable for practical implementation.

PMF Truncation

The set of probabilities for each m, $\pi_{z,m}$=P($E_m$=z/$D_m$)=P($S_m$=z+$D_m$) for z={0, 1, 2, ..., q−1}, represents a probability mass function (PMF) that constitute one form of the soft decision for a q-ary symbol. Expressing the soft decision in terms of a smaller number of probable levels is desirable from the complexity standpoint, especially if the associated performance loss can be controlled.

In principle, the performance loss associated with PMF truncation can be best managed if we obtain the probabilities of all q levels using (1), (2) and (3), rank them and then take only a prescribed number of most probable levels. In practical computation, however, the probabilities of a most likely subset of symbol error levels can reasonably be constructed, by considering only those single error patterns and their positions that are highly likely and then constructing composite error events based only on the few $R_{i,j}$'s that are near the top of the probable list. For example, consider the earlier example where the probability that $E_m$=[100000]:

$$\frac{P\left(E_m = \frac{q}{2}\right)}{P(E_m = 0)} \approx R(e_{mp}^{(1)}) + R(e_{(m-1)p+5}^{(2)}) + \ldots + R(e_{(m-1)p+1}^{(6)}) + R(e_{(m-1)p}^{(7)}) + R(e_{(m-2)p+5}^{(8)}) =$$

$$R_{1,mp} + R_{2,(m-1)p+5} + \ldots + R_{6,(m-1)p+1} + R_{7,(m-1)p} + R_{8,(m-2)p+5}$$

Now suppose $R_{1,mp}+R_{2,(m-1)p+5}$ completely dominates the $R_{i,j}$ values. In this case we can use the simpler approximation $$\frac{P\left(E_m = \frac{q}{2}\right)}{P(E_m = 0)} \approx R_{1,mp} + R_{2,(m-1)p+5}.$$

When a truncation strategy is determined based on, say, q'(<q) most probable levels, it is important to note that the PMF function should not assume zero for the remaining levels; rather, the function should distribute the residual probability evenly among the q−q' levels so that the overall probability sums to one. This residual distribution that allows some small probability even for the least likely symbol levels helps the outer decoder to recover occasional symbol errors that would have been impossible to correct focusing only on the most likely levels.

Variable level truncation is also possible where q' changes with m. Our simulation experiment actually indicates variable-level truncation with 3 or 4 different values of q' (e.g., =1, 2, 4 and 8 when q=64) gives excellence performance/complexity tradeoff.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for determining a probability, comprising:
obtaining a set of probability ratios, wherein each probability ratio in the set is a ratio of a first probability to a second probability; and
determining, using a processor, a probability P($E_m$=z) that an $m^{th}$ error symbol $E_m$ has a level of z based at least in part on one or more dominant error patterns.

2. The method of claim 1, wherein the second probability is a probability that the $m^{th}$ error symbol $E_m$ has a level of z that corresponds to an error-free level.

3. The method of claim 2, wherein the error-free level includes all 0's when expressed in bits.

4. The method of claim 1, wherein the one or more dominant error patterns include(s) a pattern that includes all 1's when expressed in bits.

5. The method of claim 1, wherein obtaining includes obtaining from a bank of error event correlators.

6. The method of claim 1 further comprising passing the determined probability to an error correction decoder configured to input q-ary symbol level soft information.

7. The method of claim 6, wherein the error correction decoder includes at least one of the following: a q-ary low density parity check (LDPC) decoder or a soft-input Reed-Solomon decoder.

8. The method of claim 1, wherein determining includes using $$P(E_m = 0) \sum_{[e_j^{(i)}]_{mp}^{(m+1)p-1} = z} R(e_j^{(i)})$$

and/or $$P(E_m = 0) \sum_{(i,j) \in A(m,z)} R_{i,j}$$

to determine P($E_m$=z).

9. The method of claim 1, wherein determining includes using $$\prod_i P(E_m = z_i)$$

to determine $P(E_m=z)$.

10. The method of claim 1, wherein determining includes using $$1 \bigg/ \left(1 + \sum_{(i,j) \in A(m,z)} R_{i,j}\right)$$

to determine $P(E_m=0)$.

11. The method of claim 1, wherein determining includes decomposing a composite error event into two or more dominant single error events.

12. The method of claim 11, wherein decomposing includes using one or more independent error events separated by i zeros when $E_m$ includes i consecutive 0's.

13. The method of claim 1, wherein determining includes operating, at least partially, on log-domain information.

14. The method of claim 1, wherein the probability $P(E_m=z)$ is part of a probability mass function (PMF) and the method further includes performing PMF truncation that includes evenly distributing a residual probability amongst q–q' levels.

15. A system for determining a probability, comprising:
an interface configured to obtain a set of probability ratios, wherein each probability ratio in the set is a ratio of a first probability to a second probability; and
a hardware processor configured to determine a probability $P(E_m=z)$ that an $m^{th}$ error symbol $E_m$ has a level of z based at least in part on one or more dominant error patterns.

16. The system of claim 15, wherein the processor is configured to determine by using $$P(E_m = 0) \sum_{[e_j^{(i)}]_{mp}^{(m+1)p-1}=z} R(e_j^{(i)})$$

and/or $$P(E_m = 0) \sum_{(i,j) \in A(m,z)} R_{i,j}$$

to determine $P(E_m=z)$.

17. The system of claim 15, wherein the processor is configured to determine by using $$\prod_i P(E_m = z_i)$$

to determine $P(E_m=z)$.

18. The system of claim 15, wherein the processor is configured to determine by using $$1 \bigg/ \left(1 + \sum_{(i,j) \in A(m,z)} R_{i,j}\right)$$

to determine $P(E_m=0)$.

19. The system of claim 15, wherein the processor is configured to determine by decomposing a composite error event into two or more dominant single error events.

20. The system of claim 15, wherein the probability $P(E_m=z)$ is part of a probability mass function (PMF) and the processor is further configured to perform PMF truncation that includes evenly distributing a residual probability amongst q–q' levels.

* * * * *